US012597203B2

(12) United States Patent
Benfold et al.

(10) Patent No.: US 12,597,203 B2
(45) Date of Patent: Apr. 7, 2026

(54) SIMULATED CONSISTENCY CHECK FOR POINTS OF INTEREST ON THREE-DIMENSIONAL MAPS

(71) Applicant: Niantic Spatial, Inc., San Francisco, CA (US)

(72) Inventors: Ben Benfold, Oxford (GB); Victor Adrian Prisacariu, Oxford (GB)

(73) Assignee: Niantic Spatial, Inc., San Francisco, CA (US)

( * ) Notice: Subject to any disclaimer, the term of this patent is extended or adjusted under 35 U.S.C. 154(b) by 0 days.

(21) Appl. No.: 18/742,562

(22) Filed: Jun. 13, 2024

(65) Prior Publication Data

US 2024/0331289 A1     Oct. 3, 2024

Related U.S. Application Data

(63) Continuation of application No. 17/879,718, filed on Aug. 2, 2022, now Pat. No. 12,039,665.

(51) Int. Cl.
G06T 17/05 (2011.01)
G06F 16/29 (2019.01)
(Continued)

(52) U.S. Cl.
CPC .............. G06T 17/05 (2013.01); G06F 16/29 (2019.01); G06T 7/70 (2017.01);
(Continued)

(58) Field of Classification Search
CPC . G06T 2207/30244; G06T 2207/20076; G06T 2207/20081; G06T 2207/10016; G06T 7/70–74; G06T 7/194; G06T 7/174; G06T 7/11; G06T 19/00; G06T 15/00; G06T 7/579; G06T 19/006; A63F 13/92; A63F 13/5378; A63F 13/216; A63F 13/211; A63F 13/213; A63F 13/25; A63F 13/35; A63F 13/65; A63F 13/655; A63F 13/533; A63F 13/5372; A63F 2300/8082;
(Continued)

(56) References Cited

U.S. PATENT DOCUMENTS 10,603,591 B1     3/2020   Navulur
10,828,569 B2    11/2020   Zhang
(Continued)

*Primary Examiner* — Wesner Sajous
(74) *Attorney, Agent, or Firm* — Fenwick & West LLP

(57) ABSTRACT

The present disclosure describes approaches to camera re-localization that improve the accuracy of re-localization determinations by performing simulated consistency checks for three-dimensional maps. Client devices associated with users of a location-based application transmit image scans to a game server, which divides the received scan data into mapping sets used to generate 3D maps of environments and validation sets used to test the accuracy of the maps. To perform the testing, the game server identifies query scans in the validation set having GPS coordinates within a threshold distance of the mapped location and uses the 3D map of the environment to generate a pose estimate for each frame. The results of the localization queries are analyzed by comparing differences between the localization pose estimates and differences between the poses of independent pairs of frames in the query scan to evaluate the accuracy of the 3D map.

20 Claims, 8 Drawing Sheets

(51) Int. Cl.

| | |
|---|---|
| *G06T 7/70* | (2017.01) |
| *G06T 15/00* | (2011.01) |
| *G06V 10/77* | (2022.01) |
| *G06V 20/50* | (2022.01) |

(52) U.S. Cl.
CPC .............. *G06T 2207/20101* (2013.01); *G06T 2207/30168* (2013.01); *G06T 2207/30244* (2013.01)

(58) Field of Classification Search
CPC ......... A63F 2300/5573; H04L 67/131; H04W 4/021; G06V 10/774; G06V 10/768; G06V 10/44; G06V 20/50; G06V 20/90; G06V 20/20
See application file for complete search history.

(56) References Cited

U.S. PATENT DOCUMENTS

| | | | | |
|---|---|---|---|---|
| 11,071,917 | B1 | 7/2021 | Navulur | |
| 11,417,069 | B1 | 8/2022 | Gupta et al. | |
| 2015/0213590 | A1 | 7/2015 | Brown et al. | |
| 2021/0187391 | A1* | 6/2021 | Ekkati ..................... | G06T 15/00 |
| 2021/0190538 | A1* | 6/2021 | Ekkati ........................ | G06T 7/73 |
| 2021/0199460 | A1* | 7/2021 | Yerli ........................ | G06T 7/579 |
| 2022/0189049 | A1 | 6/2022 | Watson et al. | |
| 2022/0351518 | A1* | 11/2022 | Doan .................... | G06V 20/20 |
| 2023/0277934 | A1* | 9/2023 | Benfold ............... | A63F 13/211 463/31 |

* cited by examiner

100

300

400

405A 405B 405C 405D 405E

Query Scan
Frames

400

500

405A 405E $D_T$ 505

505A $D_L$ 520

505B

Query Scan
Frames

Localized
Frame Poses

600

Divide received scan data into mapping and validation sets
605

Generate 3D model of environment from mapping set data
610

Periodically test accuracy of 3D mapping
615

Update database of localizability estimates based on results of testing
620

Respond to query from location-based application using stored localizability estimates
625

700

Identify query scan having GPS coordinates within a threshold distance of mapped location
705

Select independent pairs of frames from query scan
710

Generate pose estimates for selected frames
715

Compare differences between localized frame poses and query scan frames
720

Generate localizability score for point of interest
725

800

900

1

SIMULATED CONSISTENCY CHECK FOR POINTS OF INTEREST ON THREE-DIMENSIONAL MAPS

CROSS-REFERENCE TO RELATED APPLICATIONS

This application is a continuation of U.S. application Ser. No. 17/879,718, filed Aug. 2, 2022, which is incorporated by reference.

BACKGROUND

1. Technical Field

The subject matter described relates generally to camera localization, and, in particular, to measuring the accuracy of three-dimensional models of environments to improve localization determinations.

2. Problem

Camera re-localization generally refers to a process for determining the location and orientation (collectively "pose") of a camera within an environment using images captured by the camera. Camera re-localization has a wide and increasing array of uses. In augmented reality (AR) applications, a virtual environment is co-located with a real-world environment. If the pose of a camera capturing images of the real-world environment (e.g., a video feed) is accurately determined, virtual elements can be overlaid on the depiction of the real-world environment with precision. For example, a virtual hat may be placed on top of a real statue, a virtual character may be depicted partially behind a physical object, and the like.

Existing re-localization methods process frames captured by a camera using computer vision algorithms to estimate the pose of a mobile phone or other AR-enabled device using a three-dimensional model of the environment in which the user is located. Pose estimates generated by the model may be used to direct a user to a particular location relevant to the AR application. However, these algorithms often output pose estimates that do not accurately match the position and orientation of the client device. While a confidence score for a pose estimate may be sufficiently high to trigger initiation of an AR application, a false match may cause the system to generate a representation of an incorrect portion of the virtual world. Moreover, a user may be guided to the closest point of interest to the user's location without regard for the accuracy of localization estimates generated at that location. This may result in the application directing users to points of interest where the likelihood of successful localization is low, which may delay the start of the application and frustrate the user.

SUMMARY

The present disclosure describes approaches to camera re-localization that improve the accuracy of camera re-localization by performing simulated consistency checks for three-dimensional (3D) maps from which the pose estimates are generated. Client devices associated with users of a location-based application transmit image data scans to a game server, which divides the received scan data into mapping sets used to generate 3D maps of environments, and validation sets used to test the accuracy of the 3D maps. In one embodiment, the received scan data includes frames of the environment captured by one or more camera assemblies on the client device as well as time stamps at which the frames were captured and sensor data from the client device.

To test the accuracy of a 3D map, a testing module on the game server identifies query scans in the validation set having GPS coordinates within a threshold distance of the mapped location and sends frames from the query scan to a re-localization module, which uses the 3D map of the environment to generate a pose estimate for each frame. The results of the localization queries are analyzed by comparing differences between the localization pose estimates generated by the re-localization module and differences between the poses of independent pairs of frames in the query scan to evaluate the accuracy of the 3D map. To do so, the testing module uses sensor data from a client device associated with the frames used to generate the localization estimate. Differences in sensor readings may indicate the relative positions of the client device when the frames were captured. Accordingly, the testing module may determine that the 3D map is accurate if the difference in pose estimates matches the relative position information from the sensor data. The testing module uses the difference between the transforms to calculate error measurements for the 3D map and estimate the localizability of points of interest within the environment represented by the map. Localizability scores for points of interest may be written to a game database and used to guide users of the location-based application to points of interest having localizability scores over a threshold, thereby improving the user experience.

In one embodiment, a computer-implemented method includes: selecting a 3D map of an environment for testing, the 3D map including locations of one or more points of interest within the environment and associated with a location-based application; identifying a query scan comprising a plurality of frames captured by a camera assembly on a client device positioned at a point of interest within the environment; selecting independent pairs of frames from the query scan; for each selected frame, generating, by a localization model and using the 3D map, a pose estimate representing a prediction of a 3D position and orientation of the client device; for each pair of frames, comparing the pose estimates with relative position information determined based on sensor data from the client device; and generating a localizability score for the point of interest based on differences between the pose estimates and the relative position information for each pair of frames. Other embodiments include a system configured to perform the method and a non-transitory computer-readable storage medium storing instructions for performing the method.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where camera localization data is desirable. For example, the method described herein may be implemented in a location-based application that displays virtual navigation instructions or text labels that relate to real-world information. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
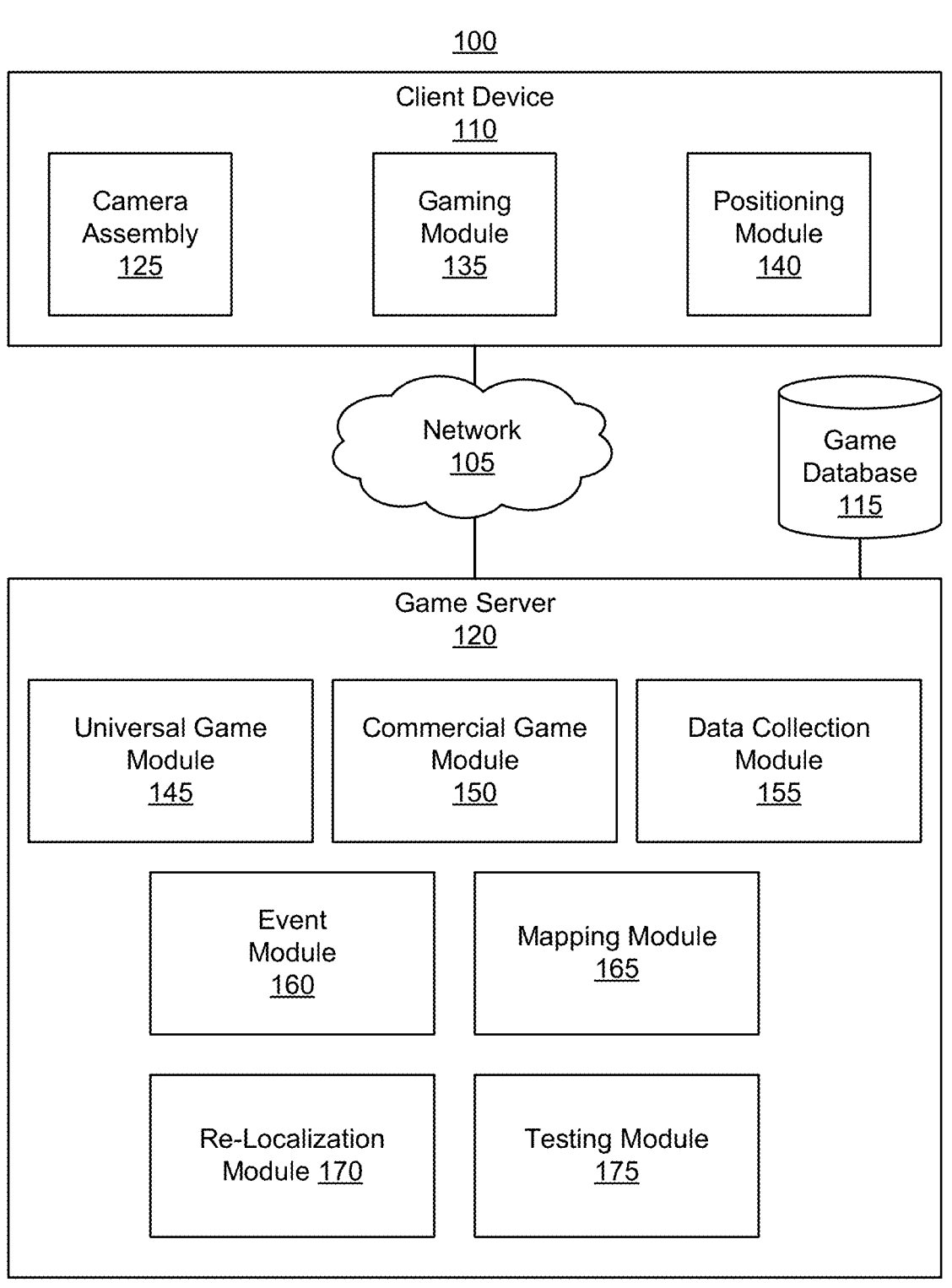
FIG. 1 illustrates a networked computing environment, in accordance with one or more embodiments.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

Figure 2:
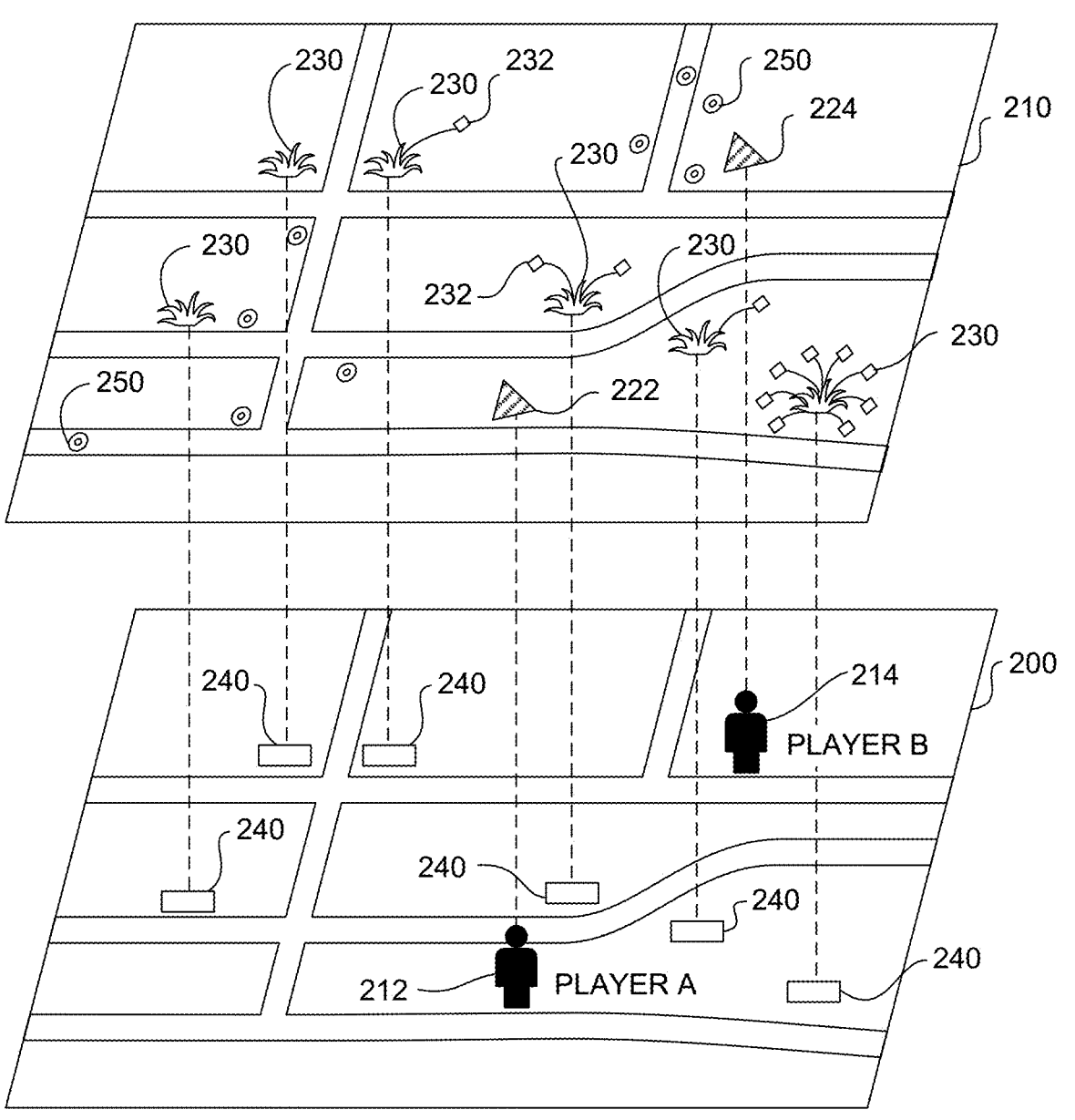
FIG. 2 illustrates a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG.

2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes software components such as a gaming module 135 and a positioning module 140. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, depth sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment in which the client device 110 is located. The camera assembly 125 may utilize a variety of varying photo sensors with varying color capture ranges at varying capture rates. The camera assembly 125 may contain a wide-angle lens or a telephoto lens. The camera assembly

125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map of the scene captured in the image data. In other embodiments, the gaming module 135 generates virtual objects for display on a semi-transparent display through which the user views the real world (e.g., an AR headset, AR glasses, etc.). Thus, the virtual objects may be overlaid on the user's view of the real world.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information. In another example, the gaming module 135 may update a virtual element based on a pose of the camera assembly, e.g., as determined by the re-localization module 170.

In one embodiment, determination of a coarse position of the client device 110 may be performed at the client device 110. The client device 110 includes a positioning module 140 comprising any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may further include various other sensors that may aid in accurately positioning the client device 110 location. While the positioning module 140 may be used to determine a course position of the client device 140, re-localization of the client device 110 (e.g., to determine the device's fine-grain location and orientation) is performed by the re-localization module 170 on the game server 120, as discussed below. For example, the coarse location (e.g., the GPS coordinates) identified by the positioning module 140 may be used to identify a three-dimensional (3D) model of the environment in which the client device 110 is located, and the re-localization module 170 localizes against the retrieved model using images captured by the camera assembly 125 on the client device 110.

In embodiments in which a coarse position of the client device is determined client-side, the positioning module 140 tracks the position of the player as the player moves around with the client device 110 in the real world and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, a mapping module 165, a re-localization module 170, and a testing module 175. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping module 165 receives image data captured by the camera assembly 125 on the client device 110 and assigns the received data to one of a mapping set used to generate a 3D map of the environment in which the client device 110 is located and a validation set used to test the accuracy of the generated 3D map, as discussed below. Received image data may be divided equally into the mapping and validation sets or the mapping module 165 may assign a greater number or percentage of received scans to one of the sets (e.g., assign 80% of incoming scans to the mapping set and 20% to the validation set).

In one embodiment, the image data is a video representing a near real-time view of the environment and is appended with metadata including data captured from sensors on the client device 110 such GPS data, sensor data (including data from movement sensors, accelerometers, gyroscopes, IMUs, barometers, positioning systems, thermometers, light sensors, depth sensors, and the like) as well as a timestamp at which the data was collected. Video scans received from client devices 110 may have varying durations. For example, a typical video scan may have a duration of 15-60 seconds and include 150-1800 individual frames. One of skill in the art will recognize, however, that scans may have shorter or longer durations and comprise fewer or additional individual camera frames.

Data in the mapping set may further include image data and associated metadata received from a plurality of other client devices 110 (e.g., crowdsourced from other users of the game server 120). The mapping module 165 uses the data in the mapping set to generate a map of the environment associated with the image data. In various implementations, the map is a 3D model of the environment and is depicted as a point cloud, mesh topology, or line junction.

Once generated, maps may be stored in the game database 115 in association with images and other sensor data collected by client devices 110 at a location and may be used to estimate the pose of a client device 110. As discussed above, determination of the player's position in the real world (as represented by the pose of the client device 110) may be used to update the player's position in the virtual world and trigger initiation of the location-based application, display of virtual elements or objects, and the like.

The re-localization module 170 uses the stored 3D map to estimate the pose of a client device 110. In one embodiment, the coarse location (e.g., the GPS coordinates) identified by the positioning module on the client device 110 are used to identify the relevant 3D map of the environment in which the client device 110 is located. The re-localization module 170 uses a computer vision algorithm to localize against the retrieved model by comparing images captured by a camera assembly 125 on the client device 110 to one or more existing images of the physical environment represented in the 3D map and generates an estimate of the location and orientation of the client device 110.

A pose estimate generated by the re-localization module 170 may be associated with a confidence score representing a probability that the pose estimate is correct. In one embodiment, determination of a pose estimate having a sufficiently high confidence level is required to initiate an augmented reality experience in the parallel reality game on the client device 110. To determine whether a candidate pose estimate may be accepted, the re-localization module 170 compares the confidence score to a score threshold and triggers initiation of the game if the score is at or above the required threshold. This threshold may be adjusted to optimize for different parameters, such as accuracy (in which case, the threshold may be higher), speed (in which case, the threshold may be lower to allow the game to start more quickly), or both. Responsive to the re-localization module 170 determining that a generated pose estimate has a sufficiently high confidence score to trigger initiation of the game, the universal game module 145 determines a corresponding position and orientation of the user in the virtual world and generates game content (e.g., one or more virtual elements) based on the virtual world position.

The testing module 175 periodically tests the accuracy of the generated 3D maps using the image data in the validation set by calculating localizability scores representing estimated likelihoods that the re-localization module 170 will generate an accurate pose estimate of a client device 110. Maps may be tested at points of interest in the parallel reality game (e.g., locations where virtual items or virtual elements are located) or at any other location represented within a 3D map.

To test a 3D map of an environment, the testing module 175 identifies query scans in the validation set having GPS coordinates within a threshold distance of the mapped location. In one embodiment, the testing module 175 filters the query scans using machine learning algorithms to identify high-quality scans for use in testing. High-quality scans may be those likely to represent a user genuinely attempting to localize the client device 110 (e.g., based on factors such as sufficient lighting quality, the speed at which the user moves the client device 110 and angle at which the client device 110 is positioned being sufficient to accurately capture the surrounding environment, and the like), while poor quality scans (i.e., those that are discarded in the filtering step) may include those where the user, for example, films their feet, places their thumb over the lens of the camera assembly 125, films in dark lighting, etc.

The testing module 175 sends frames from the identified query scans to the re-localization module 170, which uses the 3D map of the environment to generate a pose estimate of each frame and returns the estimate and associated confidence score to the testing module 175. Localization using frames from the validation set therefore simulates users of the game server 120 attempting to localize using the re-localization module 170.

Responsive to receiving the pose estimates and confidence scores for the query scan frames from the re-localization module 170, the testing module 175 analyzes the results of the localization queries to determine whether results from each query scan satisfy target accuracy criteria. To do so, the testing module 175 identifies, for each query sequence, pairs of frames that are independent of each other. In one embodiment, frames are determined to be independent of each other if either the view frustums do not intersect (i.e., the frames do not depict the same part of the world) or intersect by less than a threshold amount or the principal rays in each frame (i.e., the ray pointing forwards from the center of the view) differ by more than a threshold number of degrees (e.g., 60 degrees).

Figure 4:
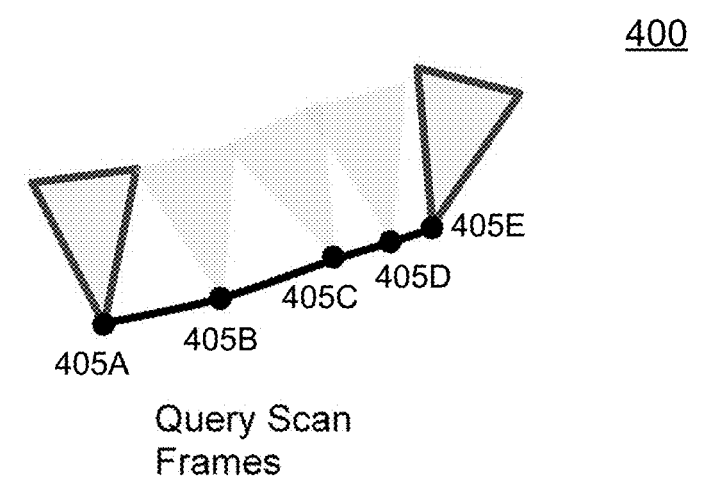
FIG. 4 illustrates a series of view frustums associated with frames in a query scan, in accordance with one or more embodiments.

For example, FIG. 4 illustrates a series of view frustums associated with frames in a query scan 400. The query scan 400 depicted in FIG. 4 includes five frames 405A, 405B, 405C, 405D, and 405E, though one of skill in the art will recognize that image scans captured by camera assemblies 125 may include many more frames than those shown in FIG. 4. As discussed above, the testing module 175 identifies in the query scan 400 pairs of independent frames for use in map testing. For example, the testing module 175 may determine that the frames 405A and 405E are independent of each other because the view frustums of each frame do not intersect. The purpose of this check is to prevent the errors in two frames from being correlated. For instance, the frames 405C and 405D are adjacent to each other in the query scan, have intersecting view frustums and principal rays that differ by fewer than 60 degrees. If the testing module 175 were to select these frames for use in testing, the pose estimates for each frame would likely result in a similar level of error in the same direction.

Returning now to FIG. 1, the testing module 175 additionally filters out from the query scan one or more frames where a tracking failure is likely to occur. For example, tracking failures may be considered to have occurred where either the client device 110 reported a failure when the scan was recorded or where the testing module 175 detects a discontinuity between frames that would not be expected from correct camera motion (e.g., instant acceleration, instant jump, etc.). Additionally, in one embodiment, use of the remaining frames in the query scan is capped at a maximum number such that the testing module 175 assigns each frame to no more than a specified number of different pairs (e.g., 10 pairs of frames).

For each pair or frames, the testing module 175 compares differences between the localization pose estimates generated by the re-localization module 170 and differences between the poses of the frames in the query scan to evaluate the accuracy of the 3D model of the environment. As described above, image data used to generate pose estimates may be associated with sensor readings, such as measurements captured by an accelerometer or gyroscope on the client device 110. The testing module 175 queries the received sensor readings from the client device 110 to determine relative difference in position between a pair of frames. The sensor data might indicate, for example, that a second frame was captured five meters to the east and 45-degrees above a first frame. For each pair of frames, the testing module 175 compares the absolute positions of the frames (i.e., the pose estimates) as determined by the re-localization module 170 to the relative position information determined based on the sensor readings. The accuracy of the localizations generated using the mappings may therefore be assessed based on whether the absolute difference in position between pairs of frames matches the relative position information indicated by the sensor data. The difference between the absolute position difference and the relative position difference may include translational difference, angular different, and/or estimated projection difference in pixels. The smaller the difference between the absolute position difference and the relative position difference, the more accurate the 3D model is determined to be. If the localizations of both frames are correct, the two differences will be identical. For instance, in the example discussed above, the testing module 175 determines that the 3D model of the environment is accurate if the pose estimates generated by the localization module 170 indicate that the second frame was captured five meters to the east and 45 degrees above the second frame.

Figure 5:
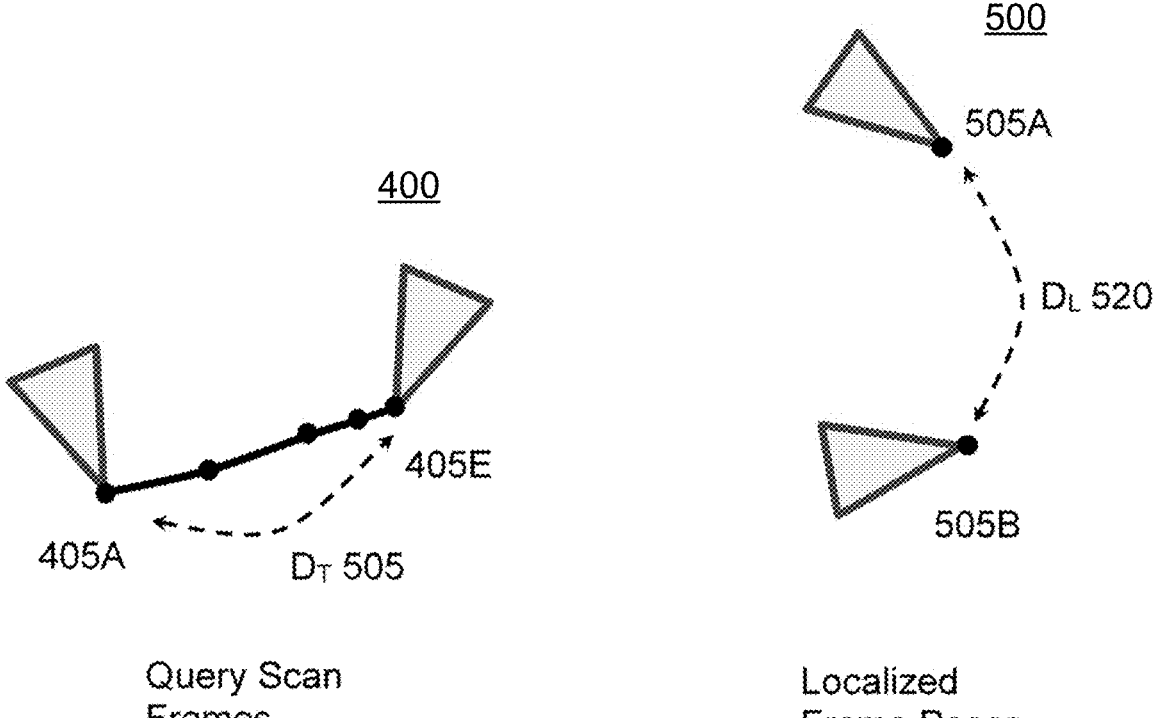
FIG. 5 illustrates a comparison of differences in transforms between query scan frames and localized pose estimates, according to one embodiment, in accordance with one or more embodiments.

For example, FIG. 5 illustrates a comparison of differences in transforms between query scan frames and localized pose estimates, according to one embodiment. As discussed above with respect to FIG. 4, the testing module 175 selects independent frames (e.g., the frames 405A and 405E) from the query scan 400 for use in testing the accuracy of the 3D map and uses sensor data associated with the independent frames to determine a difference, $D_T$ 505, in the relative positions of the client device 110 when the frames were captured. Similarly, the testing module determines an absolute difference, $D_L$ 520, between frames for which the re-localization module 170 generated pose estimates using the 3D map, such as the frames 510 and 515 from a scan 500. The relative position difference $D_T$ 505 and the absolute position difference $D_L$ 520 are compared to determine the accuracy of the 3D map.

Returning now to FIG. 1, the testing module 175 uses the difference between the transforms to calculate error measurements for the 3D model and estimate the localizability of a point of interest included in the model, such as the location of a virtual item or virtual element used in the parallel reality game. The localizability score for a point of interest represents the probability that the re-localization module 170 will be able to generate a pose estimate of a client device 110 to at least a threshold level of accuracy within a specified period of time (e.g., 30 seconds). For example, a localizability of 80% means that eight out of ten users who visit the point of interest will be able to localize to a threshold level of accuracy within the specified time period. In one embodiment, localizations are considered to have acceptable accuracy if they allow the universal game module 145 to render objects within a threshold number of pixels of the correct position on a display of the client device 110. The threshold number of pixels may differ based on the display size or resolution (e.g., a localization may be considered accurate if the object can be rendered with 200 pixels of the correct position on a 1080-pixel display).

To generate the localizability estimate, the testing module 175 combines the confidence score of the pose estimate for a pair of frames in the query scan with a scan quality score for the query scan. The scan quality score for the query scan may be a value indicating the level of localization and consistency for the query scan. For example, for a specific location, the testing module 175 may identify a set of query scans for validation (e.g., sixteen query scans). The testing module 175 checks localization and consistency for each query scan. In one embodiment, for a query scan to be considered as "successful," at least 10% of the frames in the query scan need to be localized and the mean error of the localized frames should be less than 200 pixels at 1080p. To estimate the localizability, the scan quality scores may be used as weighting coefficients so that query scans having higher quality scores contribute more than those having lower scan quality scores. The testing module 175 may use a prior localizability value as a starting point and use a Dirichlet distribution to calculate the likelihood distribution of the true localizability value.

A localizability score for a point of interest may be written to the game database 115 and used to guide users of the location-based application to points of interest having localizability scores over a threshold (e.g., 80%) or enabling application features when users are positioned at points of interest with localizability scores over the threshold. Moreover, in some embodiments, localizability estimates for points of interest may be used to respond to queries from other location-based applications or games. For example, a second location-based application may send to the game server 120 GPS location information for a user of the second location-based application. The game server 120 may respond with a list of locations (e.g., points of interest) closest to the user location where localizability scores meet or exceed a required threshold, and the second location-based application may guide the user toward a location from the list or otherwise integrate the location as part of the game flow.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Figure 3:
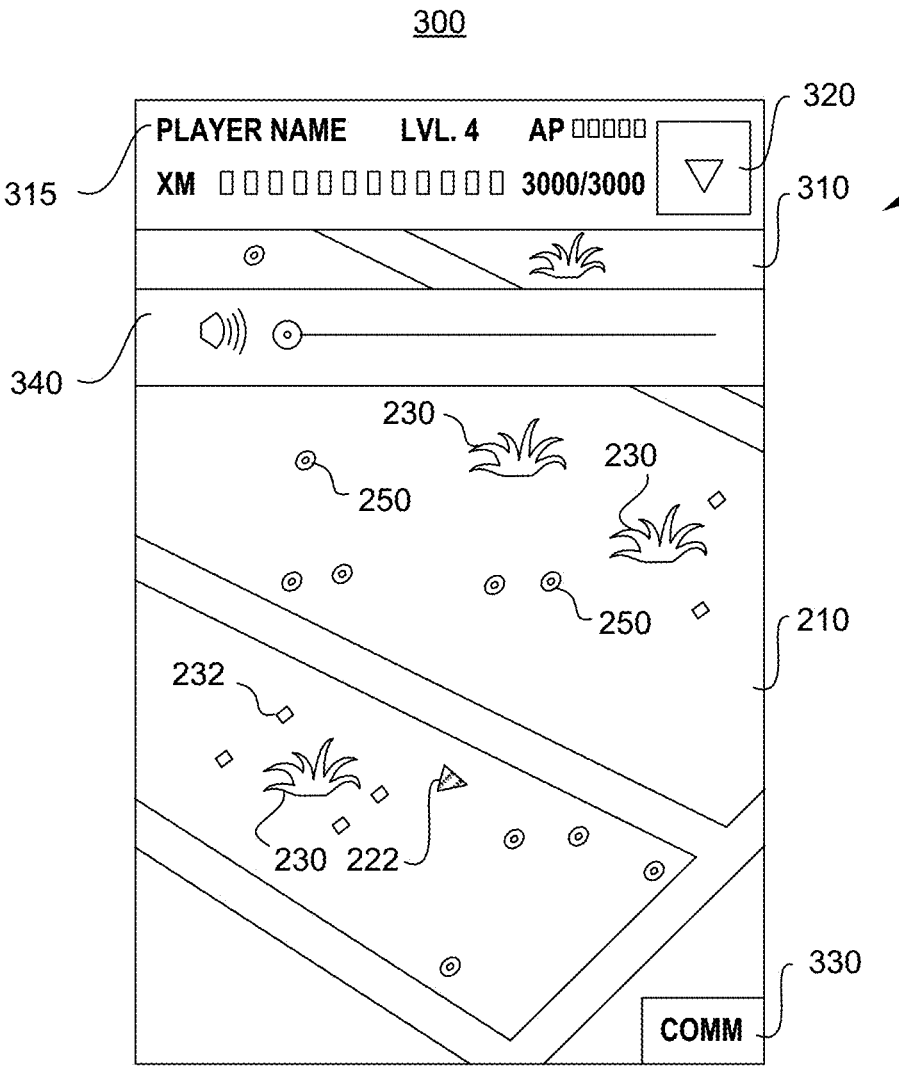
FIG. 3 illustrates an exemplary game interface of a parallel reality game, in accordance with one or more embodiments.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user. Exemplary Game Interface FIG. 3 depicts one embodiment of a game interface 300 that can be presented on a display of a client device 110 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

EXAMPLE METHODS

Figure 6:
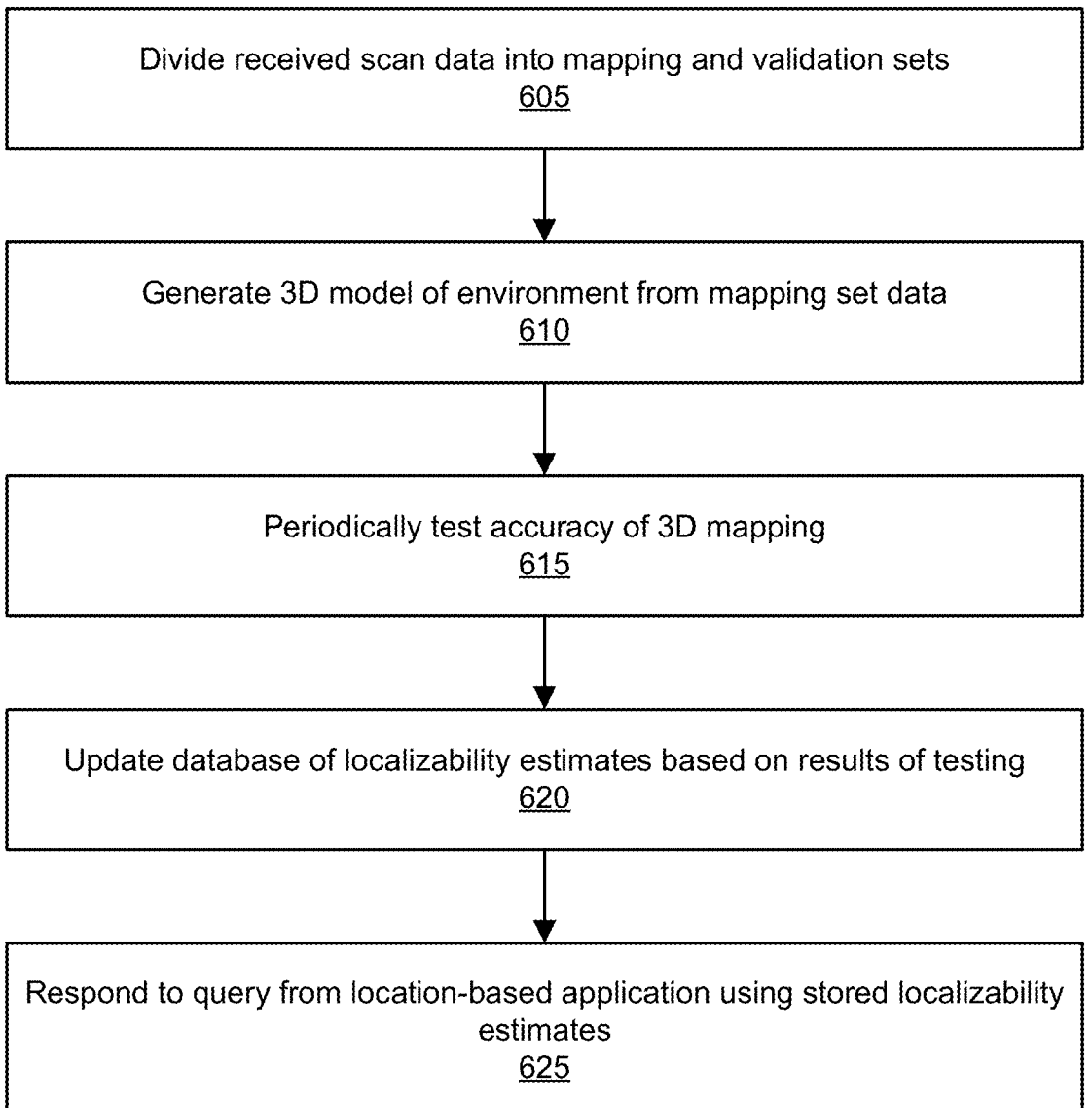
FIG. 6 is a flowchart describing a general process of performing a simulated consistency check of a 3D model of an environment, in accordance with one or more embodiments.

FIG. 6 is a flowchart describing one iteration of a method 700 of performing a simulated consistency check of a 3D model of an environment, in accordance with one or more embodiments. The steps of FIG. 6 are illustrated from the perspective of the game server 120 performing the method 600. However, some or all of the steps may be performed by other entities and/or components. In addition, some embodiments may perform the steps in parallel, perform the steps in different orders, or perform different steps.

In the embodiment shown, a game server 120 communicates with a client device 110 over a network 105 to provide a location-based application, such as parallel reality game, to a user of the client device 110. Client devices 110 associated with users of the location-based application (e.g., players of a parallel reality game) provide to the game server 120 sensory data of the physical environment in which the user is located. In one embodiment, the client device 110 captures and sends to the game server 120 image data comprising scans of the physical environment (e.g., one or more frames captured by a camera 125 on the client device 110) and sensor data, such as measurements captured by an accelerometer, gyroscope or other sensor on the client device 110. The image and sensor data may be appended with a time stamp corresponding to the time at which the data was captured by the client device 110.

The mapping module 165 on the game server 120 receives scan data (e.g., image and sensor data) from a plurality of client devices 110. In the embodiment shown, the method 600 begins with the mapping module 165 dividing 605 received scan data into a first (mapping) set and a second (validation) set. Data in the mapping set is used by the mapping module 165 to generate 610 a map of the environment in which the user is located. As discussed above, in one embodiment, the mapping comprises a 3D model of the environment and may be implemented as a point cloud or mesh topology.

Figure 7:
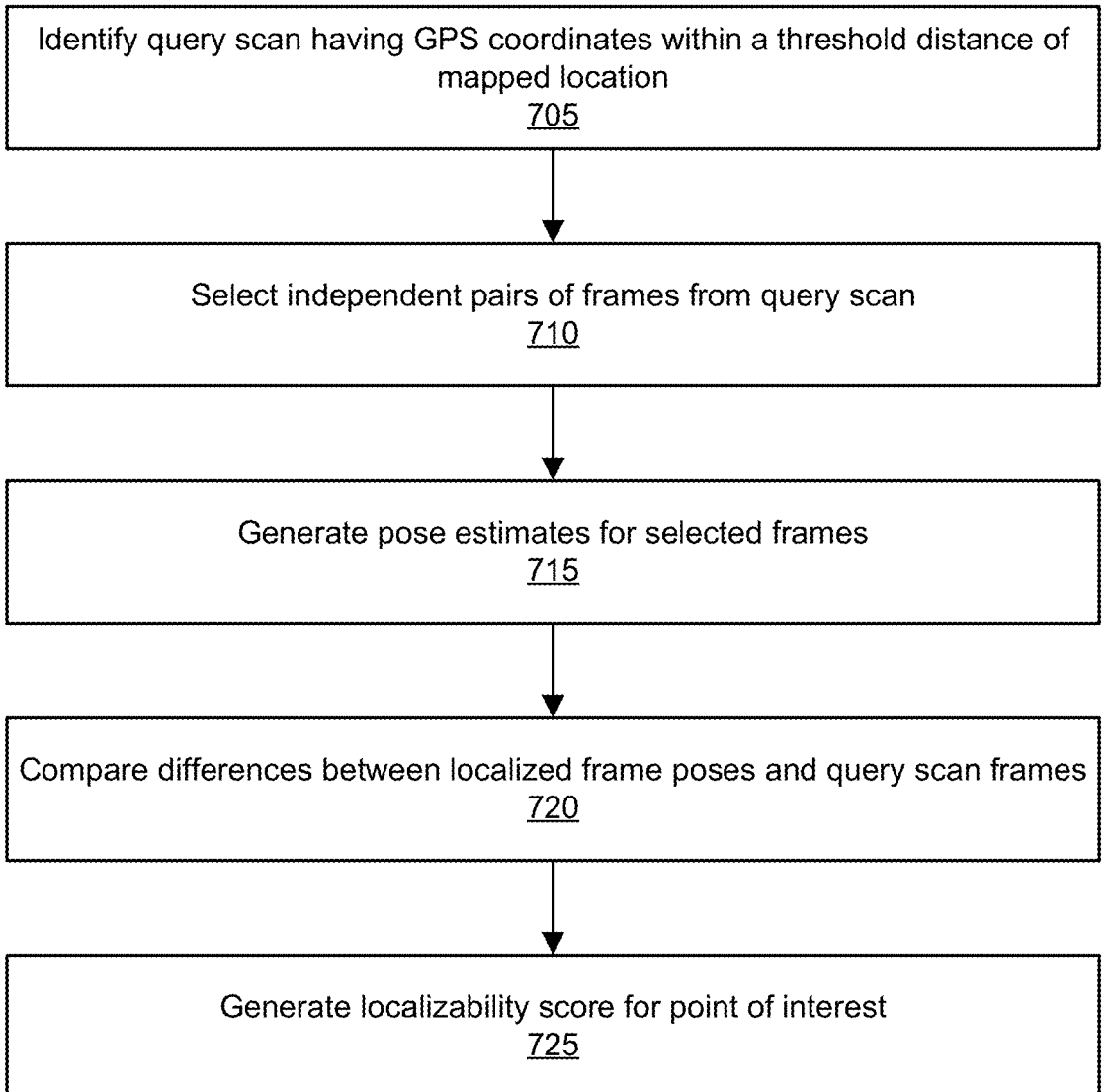
FIG. 7 is a flowchart describing a general process of calculating localizability estimates for points of interest, in accordance with one or more embodiments.

Once generated, a 3D map of an environment may be transmitted to the game database 115 for storage. In one embodiment, a testing module 175 periodically tests 615 the accuracy of each mapping stored in the game database 115. Turning now to FIG. 7, it describes a method 700 for performing this testing by calculating localizability estimates for points of interest included in a 3D map. The method 700 begins with the testing module 175 identifying 705 a query scan having GPS coordinates within a threshold distance of the mapped location. As discussed above, a query scan comprises image and sensor data received from a client device 110. The scan may include, for example, individual frame captured by one or more camera assemblies 125 as well as time stamps indicating when each frame was captured and sensor data indicating readings from various device sensors.

To test the accuracy of the 3D map, the testing module 175 selects 710 pairs of frames from the query scan for comparison to localized frame poses. In one embodiment, the selected frames are independent of each other such that the view frustums of the frames do not intersect (i.e., the frames do not depict the same part of the environment) or the principal rays of the frames differ by more than a threshold amount (e.g., 60 degrees). For each pair of frames, the re-localization module 170 uses the 3D map to generate 715 pose estimates for the frames representing the 3D location and orientation of the client device 110 when each frame was captured. The re-localization module 170 returns the generated pose estimates to the testing module 175, which compares 720 the differences between the localized frame poses and the query scan frames and generates 725 a localizability score for a point of interest based on the difference in the transforms between the two pairs of poses. In some embodiments, the testing module 175 may identify a set of query scans (e.g., sixteen query scans) and calculate the localizability score based on the localization and consistency of the set of query scans determined from pairs of independent frames in the query scans.

Returning now to FIG. 6, the testing module 175 updates 620 the game database based on localizability estimates for points of interest included in the mapping. In one embodiment, the game server 120 uses the stored localizability estimates to respond 625 to queries from other location-based applications, for example, by providing lists of locations having localizability scores over a threshold to allow the other location-based application to direct its users to points of interest where the users are likely to successfully localize.

Figure 8:
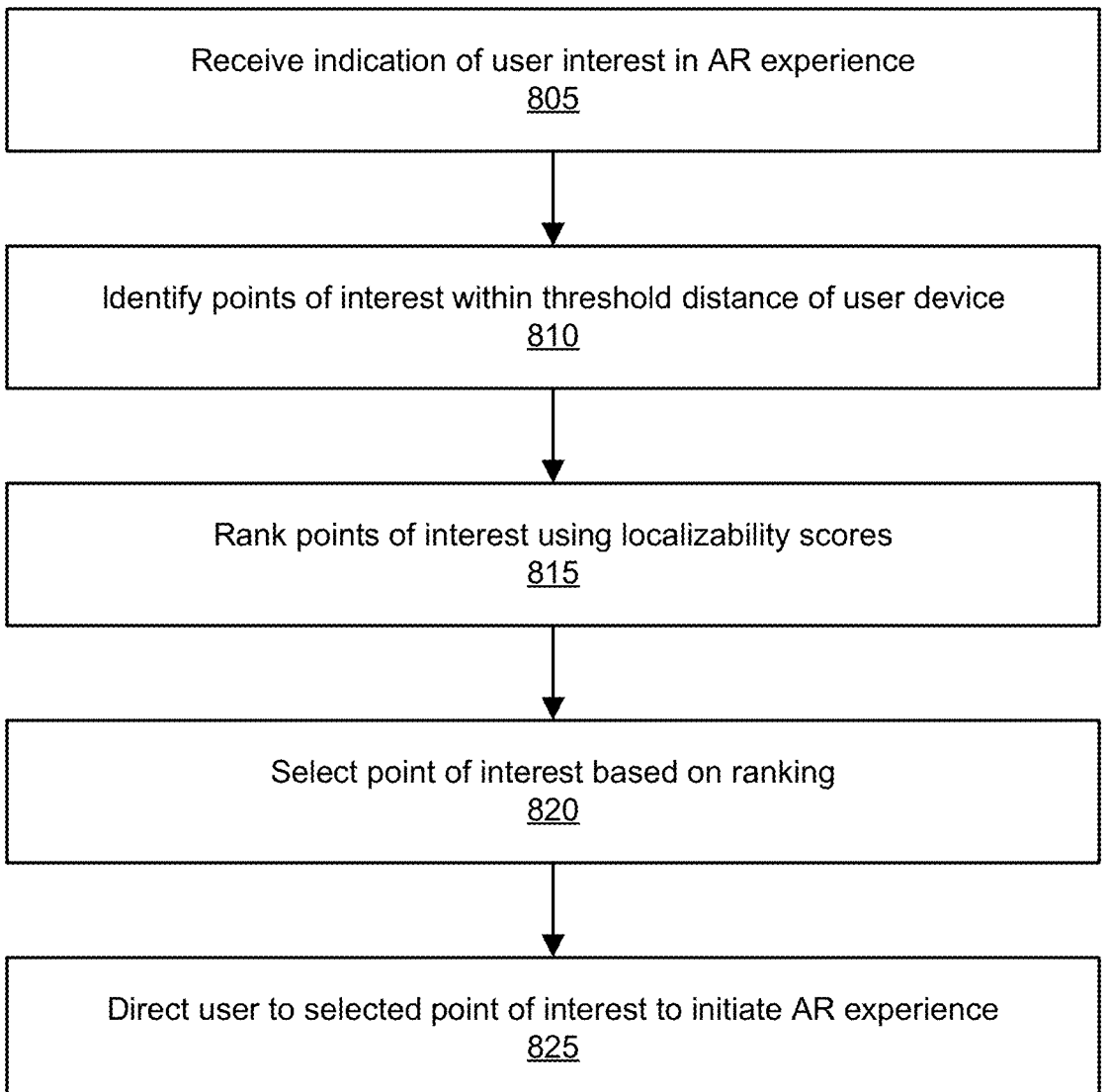
FIG. 8 is a flowchart describing a general process of using localizability scores to initiate an augmented reality experience, in accordance with one or more embodiments.

FIG. 8 is a flowchart illustrating one iteration of a method 800 of using localizability scores to initiate an AR experience, in accordance with one or more embodiments. The method 800 begins with the game server 120 receiving 805 an indication of user interest in an AR experience, such as user input comprising a request to initiate a parallel-reality game or other location-based application on the client device 110. As described above with respect to FIG. 2, the location-based application includes a plurality of points of interest in the virtual world that correspond to a user's position in the real world. A point of interest may represent a virtual world position of a virtual item or virtual element that the user may interact with to achieve a game objective. Points of interest may be linked to landmarks, geographic locations, or objects in the real world, such as buildings, businesses, monuments, and the like, and user interactions at points of interest may include capturing or claiming ownership of a virtual item, using a virtual item, spending virtual currency, etc.

The game server 120 additionally receives location data from a positioning module 140 on the client device 110 representing a position of the user in the real world and queries a 3D map of the environment in which the user is located to identify 810 one or more points of interest within a threshold distance of the client device 110. Each identified point of interest may be associated with a localizability score generated, for example, using the method 700 described above. Responsive to identifying the one or more points of interest, the game server 120 ranks 815 the identified points of interest using the localizability scores and selects 820 a point of interest for the requested AR experience based on the ranking. The selected point of interest may therefore represent a location in the virtual world having a high likelihood that the user will successfully localize to a high degree of confidence within a threshold time period and may or may not be the closest point of interest to the user's current location.

At 825, the game server 120 directs the user to the selected point of interest to initiate the AR experience. For example, the game server 120 may cause the user's client device 110 to display an indication that a particular virtual object, character, or experience is available at the selected point of interest. As another example, the game server 120 may cause the user's client device 110 to display indicators (e.g., arrows or a trail on the ground) of a route to the selected point of interest.

Example Computing System

Figure 9:
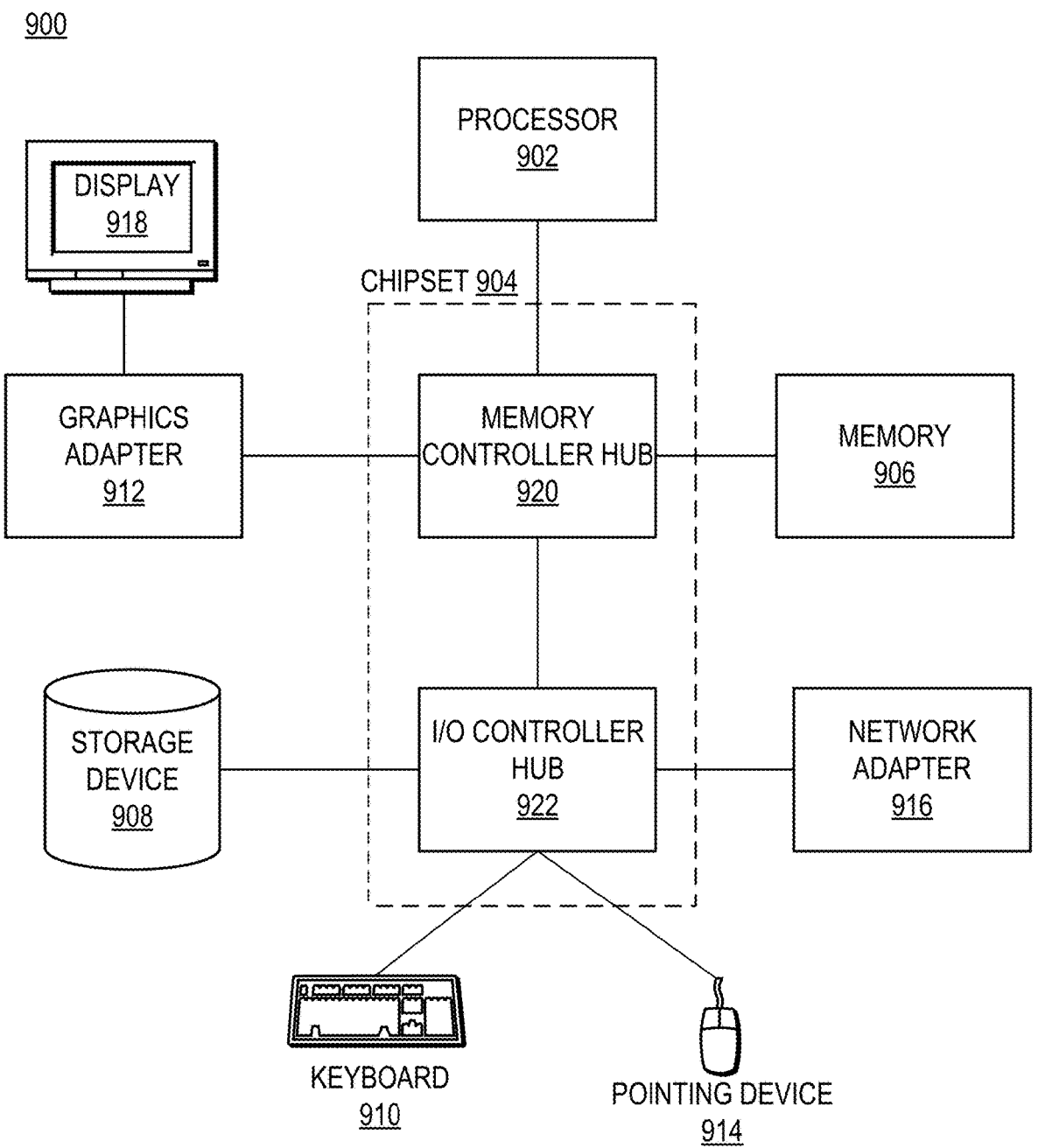
FIG. 9 illustrates an example computer system suitable for use as the game server or client device of FIG. 1, according to one or more embodiments.

FIG. 9 is an example architecture of a computing device, according to an embodiment. Although FIG. 9 depicts a high-level block diagram illustrating physical components of a computer used as part or all of one or more entities described herein, in accordance with an embodiment, a computer may have additional, less, or variations of the components provided in FIG. 9. Although FIG. 9 depicts a computer 900, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 9 are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O hub 922. In another embodiment, the memory 906 is coupled directly to the processor 902 instead of the chipset 904. In some embodiments, the computer 900 includes one or more communication buses for interconnecting these components. The one or more communication buses optionally include circuitry (sometimes called a chipset) that interconnects and controls communications between system components.

The storage device 908 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 908 can also be referred to as persistent memory. The pointing device 914 may be a mouse, track ball, or other type of pointing device, and is used in combination with the keyboard 910 to input data into the computer 900. The graphics adapter 912 displays images and other information on the display 918. The network adapter 916 couples the computer 900 to a local or wide area network.

The memory 906 holds instructions and data used by the processor 902. The memory 906 can be non-persistent memory, examples of which include high-speed random-access memory, such as DRAM, SRAM, DDR RAM, ROM, EEPROM, flash memory.

As is known in the art, a computer 900 can have different and/or other components than those shown in FIG. 9. In addition, the computer 900 can lack certain illustrated components. In one embodiment, a computer 900 acting as a server may lack a keyboard 910, pointing device 914, graphics adapter 912, and/or display 918. Moreover, the storage device 908 can be local and/or remote from the computer 900 (such as embodied within a storage area network (SAN)).

As is known in the art, the computer 900 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 908, loaded into the memory 906, and executed by the processor 902.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate+/−10% unless another meaning is apparent from the context. From example, "approximately ten" should be understood to mean "in a range from nine to eleven."

Upon reading this disclosure, those of skill in the art will appreciate still additional alternative structural and functional designs for a system and a process for performing re-localization. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:
storing, at a data store, localizability scores for a plurality of points of interest within environments represented by three-dimensional maps, the localizability scores representing estimated likelihoods that a computing device will generate pose estimates for client devices at corresponding ones of the plurality of points of interest with at least a threshold level of accuracy;
receiving, at the computing device, from a location-based application, GPS coordinates for a client device associated with the location-based application;
selecting, by the computing device, one or more points of interest based on the GPS coordinates, each of the one or more points of interest having a localizability score over a threshold; and
sending, by the computing device, the selected one or more points of interest to the location-based application.

2. The computer-implemented method of claim 1, further comprising the computing device:
receiving second GPS coordinates for the client device;
detecting, using the second GPS coordinates, a position of the client device at one of the selected one or more points of interest;
selecting a 3D map of an environment associated with the second GPS coordinates; and
localizing the client device using the selected 3D map.

3. The computer-implemented method of claim 2, wherein localizing the client device using the selected 3D map comprises generating a pose estimate representing a 3D position and orientation of the client device.

4. The computer-implemented method of claim 2, wherein the point of interest comprises a location for an augmented reality event associated with the location-based application.

5. The computer-implemented method of claim 2, wherein the 3D map of the environment is generated using a plurality of sets of image data and sensor data captured by camera assemblies on a plurality of client devices.

6. The computer-implemented method of claim 5, wherein the sensor data comprises readings from one or more of a movement sensor, an accelerometer, a gyroscope, an inertial measurement unit, a barometer, a positioning system, a thermometer, a light sensor, and a depth sensor on the client device.

7. The computer-implemented method of claim 1, wherein a point of interest is associated with a location of a virtual item or a virtual element used in a parallel reality application.

8. The computer-implemented method of claim 1, wherein the localizability scores represent likelihoods that the computing device will generate with at least the threshold level of accuracy within a specified period of time.

9. The computer-implemented method of claim 1, wherein a localizability score for a point of interest is generated based on a confidence score of a pose estimate for a pair of frames in a query scan and a scan quality score for the query scan.

10. The computer-implemented method of claim 9, wherein the confidence score for a pose estimate represents a probability that the pose estimate is correct and wherein the scan quality score indicates a level of localization and consistency of the query scan.

11. A non-transitory computer-readable storage medium comprising instructions executable by a computing device, the instructions, when executed, causing the computing device to perform operations including:

storing, at a data store, localizability scores for a plurality of points of interest within environments represented by three-dimensional maps, the localizability scores representing estimated likelihoods that a computing device will generate pose estimates for client devices at corresponding ones of the plurality of points of interest with at least a threshold level of accuracy;

receiving, at the computing device, from a location-based application, GPS coordinates for a client device associated with the location-based application;

selecting, by the computing device, one or more points of interest based on the GPS coordinates, each of the one or more points of interest having a localizability score over a threshold; and sending, by the computing device, the selected one or more points of interest to the location-based application.

12. The non-transitory computer-readable storage medium of claim 11, wherein the operations further comprise:

receiving second GPS coordinates for the client device;

detecting, using the second GPS coordinates, a position of the client device at one of the selected one or more points of interest;

selecting a 3D map of an environment associated with the second GPS coordinates; and localizing the client device using the selected 3D map.

13. The non-transitory computer-readable storage medium of claim 12, wherein localizing the client device using the selected 3D map comprises generating a pose estimate representing a 3D position and orientation of the client device.

14. The non-transitory computer-readable storage medium of claim 12, wherein the point of interest comprises a location for an augmented reality event associated with the location-based application.

15. The non-transitory computer-readable storage medium of claim 12, wherein the 3D map of the environment is generated using a plurality of sets of image data and sensor data captured by camera assemblies on a plurality of client devices.

16. The non-transitory computer-readable storage medium of claim 15, wherein the sensor data comprises readings from one or more of a movement sensor, an accelerometer, a gyroscope, an inertial measurement unit, a barometer, a positioning system, a thermometer, a light sensor, and a depth sensor on the client device.

17. The non-transitory computer-readable storage medium of claim 11, wherein a point of interest is associated with a location of a virtual item or a virtual element used in a parallel reality application.

18. The non-transitory computer-readable storage medium of claim 11, wherein the localizability scores represent likelihoods that the computing device will generate with at least the threshold level of accuracy within a specified period of time.

19. The non-transitory computer-readable storage medium of claim 11, wherein a localizability score for a point of interest is generated based on a confidence score of a pose estimate for a pair of frames in a query scan and a scan quality score for the query scan.

20. The non-transitory computer-readable storage medium of claim 19, wherein the confidence score for a pose estimate represents a probability that the pose estimate is correct and wherein the scan quality score indicates a level of localization and consistency of the query scan.

* * * * *